No. 786,892. PATENTED APR. 11, 1905.
E. HAPPE.
CAPSULE CUTTER.
APPLICATION FILED MAR. 24, 1904.
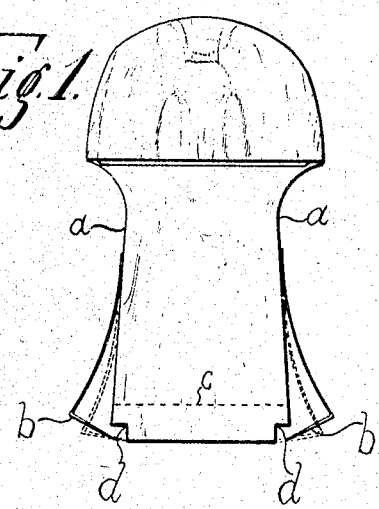
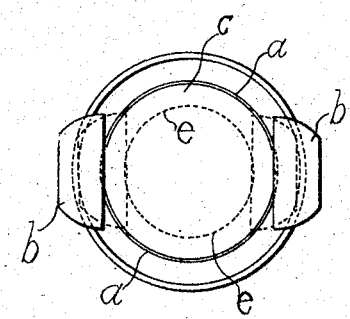

No. 786,892.

Patented April 11, 1905.

UNITED STATES PATENT OFFICE.

ERNST HAPPE, OF HAMBURG, GERMANY, ASSIGNOR TO CARL AUGUST FISCHER AND ALBERT GEORG FOSS, OF ALTONA, GERMANY.

CAPSULE-CUTTER.

SPECIFICATION forming part of Letters Patent No. 786,892, dated April 11, 1905.

Application filed March 24, 1904. Serial No. 199,888.

*To all whom it may concern:*

Be it known that I, ERNST HAPPE, a subject of the King of Prussia, Emperor of Germany, residing in Hamburg, Germany, have invented new and useful Improvements in Capsule-Cutters, of which the following is a specification.

This invention relates to an appliance for cutting off capsules attached to bottles and the like.

The device consists of a cylindrical or annular haft adapted to be placed over the top of the capsule and to which one or more cutters are so attached that when pressure is applied by the hand or the finger the edges of the cutters are pressed into the interior of the haft. The haft is likewise provided with a guide-plate or stop which when the appliance is in use bears against the top of the neck of the bottle. The guide-plate and the cutters are so arranged in relation to one another that the edges of the cutters cut the capsule sidewise a few millimeters below the plate when the guide-plate lies against the upper part of the neck of the bottle and the cutting appliance with the pressed-in cutters is partially rotated in this position.

The cutting appliance is especially intended for cutting off the tops of capsules attached to wine-bottles and the like. A form of the device on a scale suitable for this purpose is illustrated in the drawings by way of example.

Figure 1 is a side elevation; Fig. 2, an inverted plan.

*a* is the haft.

*b b* are the cutters, the dotted line *c* indicating the position of the guide-plate.

*d d* are gaps in the side of the haft *a*, through which the cutters are moved when pressed inward with the hand.

The dotted circle *e* in Fig. 2 represents the sides of capsuled neck of the bottle.

Dotted lines in the two figures indicate the positions of the cutters when the device is in use.

When the cutting appliance is used, the guide-plate *c* is put on the top of the bottle-neck, the spring-blades of the cutters *b b* are pressed, and the cutting device turned around the bottle to the extent of one hundred and eighty degrees. When this turning operation is effected, the two cutters cut off the capsule. When the cutter is removed, the head of the capsule which has been cut off is removed with it.

The width of the haft may vary according to the particular purpose to which the cutter is to be applied. The haft *a* may also be of annular shape, with the spring-cutters arranged horizontally, the important point being simply the arrangement of cutters and a guide-plate on a haft in the manner described above. The guide-plate may also be replaced by a transverse piece of any preferred form arranged in the frame *a* at the proper height. If desired, a collar even would suffice, placed in the interior of the frame *a* in the position occupied by the guide-plate *c*.

What I claim as new, and desire to secure by Letters Patent, is—

A cutter for removing the tops of bottle-capsules, comprising a holder having an opening of sufficient size and depth to admit a limited portion of the top of the bottle-neck, opposite flat springs mounted on the outside of said holder, the free ends of said springs being adapted to move in a direction transverse of said holder and of the inserted bottle-neck, cutting edges carried by the free ends of said springs adapted to be brought in contact with the bottle-neck and its inclosing capsule, said springs normally holding said cutting edges out of contact with the bottle neck and capsule.

In testimony whereof I affix my signature.

ERNST HAPPE.

In presence of—
 E. H. L. MUMMENHOFF,
 J. CHRIST. HAFERMANN.